US010590262B2

(12) United States Patent
Pahnke et al.

(10) Patent No.: US 10,590,262 B2
(45) Date of Patent: *Mar. 17, 2020

(54) SURFACTANT MIXTURES

(71) Applicant: Merck Patent GmbH, Darmstadt (DE)

(72) Inventors: Joerg Pahnke, Darmstadt (DE);
Gerhard Jonschker, Heppenheim (DE); Steffen Schellenberger, Darmstadt (DE); Mathias Kaiser, Huenfeld (DE)

(73) Assignee: Merck Patent GmbH, Darmstadt (DE)

( * ) Notice: Subject to any disclaimer, the term of this patent is extended or adjusted under 35 U.S.C. 154(b) by 635 days.

This patent is subject to a terminal disclaimer.

(21) Appl. No.: 14/418,970

(22) PCT Filed: Jul. 26, 2013

(86) PCT No.: PCT/EP2013/002219
§ 371 (c)(1),
(2) Date: Feb. 2, 2015

(87) PCT Pub. No.: WO2014/023397
PCT Pub. Date: Feb. 13, 2014

(65) Prior Publication Data
US 2015/0210830 A1 Jul. 30, 2015

(30) Foreign Application Priority Data
Aug. 6, 2012 (EP) .................................... 12005710

(51) Int. Cl.
| | | |
|---|---|---|
| B01F 17/00 | (2006.01) | |
| C09D 7/63 | (2018.01) | |
| C09D 7/47 | (2018.01) | |
| C10M 129/72 | (2006.01) | |
| C10M 137/04 | (2006.01) | |
| C08K 5/521 | (2006.01) | |
| C08K 5/11 | (2006.01) | |
| C09D 11/02 | (2014.01) | |
| C08K 5/00 | (2006.01) | |
| C08K 5/41 | (2006.01) | |
| C08K 5/51 | (2006.01) | |

(52) U.S. Cl.
CPC .......... C08K 5/521 (2013.01); B01F 17/0035 (2013.01); B01F 17/0085 (2013.01); C08K 5/11 (2013.01); C09D 7/47 (2018.01); C09D 7/63 (2018.01); C09D 11/02 (2013.01); C10M 129/72 (2013.01); C10M 137/04 (2013.01); C08K 5/0008 (2013.01); C08K 5/41 (2013.01); C08K 5/51 (2013.01)

(58) Field of Classification Search
CPC . C08K 5/521; C08K 5/11; C08K 5/51; C08K 5/41; C08K 5/0008; C09D 7/63; C09D 7/47; C09D 11/02; C10M 129/72; C10M 137/04; B01F 17/0035; B01F 17/0085
See application file for complete search history.

(56) References Cited

U.S. PATENT DOCUMENTS

| | | | |
|---|---|---|---|
| 4,968,599 A | 11/1990 | Pitt et al. | |
| 4,988,610 A | 1/1991 | Pitt et al. | |
| 6,706,923 B2 | 3/2004 | Haniff et al. | |
| 6,890,608 B2 | 5/2005 | Morishima et al. | |
| 8,008,358 B2 | 8/2011 | Kirsch et al. | |
| 9,115,062 B2 * | 8/2015 | Hierse | ................ B01F 17/0035 |
| 9,481,643 B2 * | 11/2016 | Friedrich | .............. C07C 309/17 |
| 9,695,117 B2 * | 7/2017 | Pahnke | .................. A01N 25/30 |
| 2003/0153780 A1 | 8/2003 | Haniff et al. | |
| 2003/0223026 A1 | 12/2003 | Morishima et al. | |
| 2005/0176605 A1 * | 8/2005 | Lassila | ............... C08G 65/2609 |
| | | | 510/175 |
| 2005/0233922 A1 * | 10/2005 | Jung | ........................ C11D 1/28 |
| | | | 510/175 |
| 2007/0203050 A1 | 8/2007 | Oetter et al. | |
| 2008/0113085 A1 * | 5/2008 | Peng | ..................... C04B 41/009 |
| | | | 427/11 |
| 2008/0149878 A1 | 6/2008 | Kirsch et al. | |
| 2008/0166821 A1 * | 7/2008 | Oyamada | ............. G01N 33/558 |
| | | | 436/536 |

(Continued)

FOREIGN PATENT DOCUMENTS

DE 10 2004 021208 A1 * 11/2005
JP 2001133984 A 5/2001

(Continued)

OTHER PUBLICATIONS

International Search Report from PCT Application No. PCT/EP2013/002219 dated Feb. 3, 2014.

(Continued)

Primary Examiner — Stephen E Rieth
(74) Attorney, Agent, or Firm — Millen White Zelano & Branigan

(57) ABSTRACT

The present invention relates to novel surfactant mixtures comprising at least one compound A whose dynamic surface tension $\gamma_{dyn.}$ at a use concentration of 0.1% by weight and a bubble lifetime of 100 ms is <45 mN/m, and at least one compound B whose static surface tension $y_{stat}$ measured at a use concentration of 0.1% by weight is less than or equal to the static surface tension $Y_{stat}$ of compound A, to the use thereof as additives, for example in preparations for surface coating, such as paints, lacquers, protective coatings and special coatings in electronic or in optical applications. At least one compound in the novel surfactant mixture is a fluorosurfactant.

14 Claims, 2 Drawing Sheets

(56) References Cited

U.S. PATENT DOCUMENTS

| | | | |
|---|---|---|---|
| 2009/0320718 A1* | 12/2009 | Hierse | A61K 8/70 106/287.32 |
| 2011/0088594 A1 | 4/2011 | Claus et al. | |
| 2011/0118428 A1 | 5/2011 | Hierse et al. | |
| 2012/0111233 A1* | 5/2012 | Hierse | B01F 17/0035 106/499 |
| 2013/0269568 A1 | 10/2013 | Claus et al. | |

FOREIGN PATENT DOCUMENTS

| | | |
|---|---|---|
| JP | 2009111286 A | 5/2009 |
| WO | 03/010128 A2 | 2/2003 |
| WO | 2006072401 A1 | 7/2006 |
| WO | 2009149807 A1 | 12/2009 |
| WO | 2010003567 A2 | 1/2010 |
| WO | 2010149262 A1 | 12/2010 |
| WO | 2011082770 A2 | 7/2011 |
| WO | 2012084118 A1 | 6/2012 |

OTHER PUBLICATIONS

Douglas E. Hirt et al. "Dynamic Surface Tension of Hydrocarbon and Fluorocarbon Surfactant Solutions using the Maximum Bubble Pressure Method" Colloids and Surfaces, [1990], vol. 44, pp. 101-117.

C.H.J. Johnson et al. "Surface Shape and the Calculation of Surface Tension From Maximum Bubble Pressure" Journal of Colloid and Interface Science, [1974], vol. 47, No. 1, pp. 117-121.

Zhao-Tie Liu et al. "Phase Behaviors of Aerosol-OT Analogue Fluorinated Surfactants in 1,1,1,2-Tetrafluoroethane and Supercritical $CO_2$" Ind. Eng. Chem. Res., [2007], vol. 46, pp. 22-28.

A.R. Pitt, et al. "The efficiency of dynamic surface tension reductions within homologous series of surfactants in aqueous gelatin solution" Progr. Colloid Polym Sci, [1997], vol. 103, pp. 307-317.

* cited by examiner

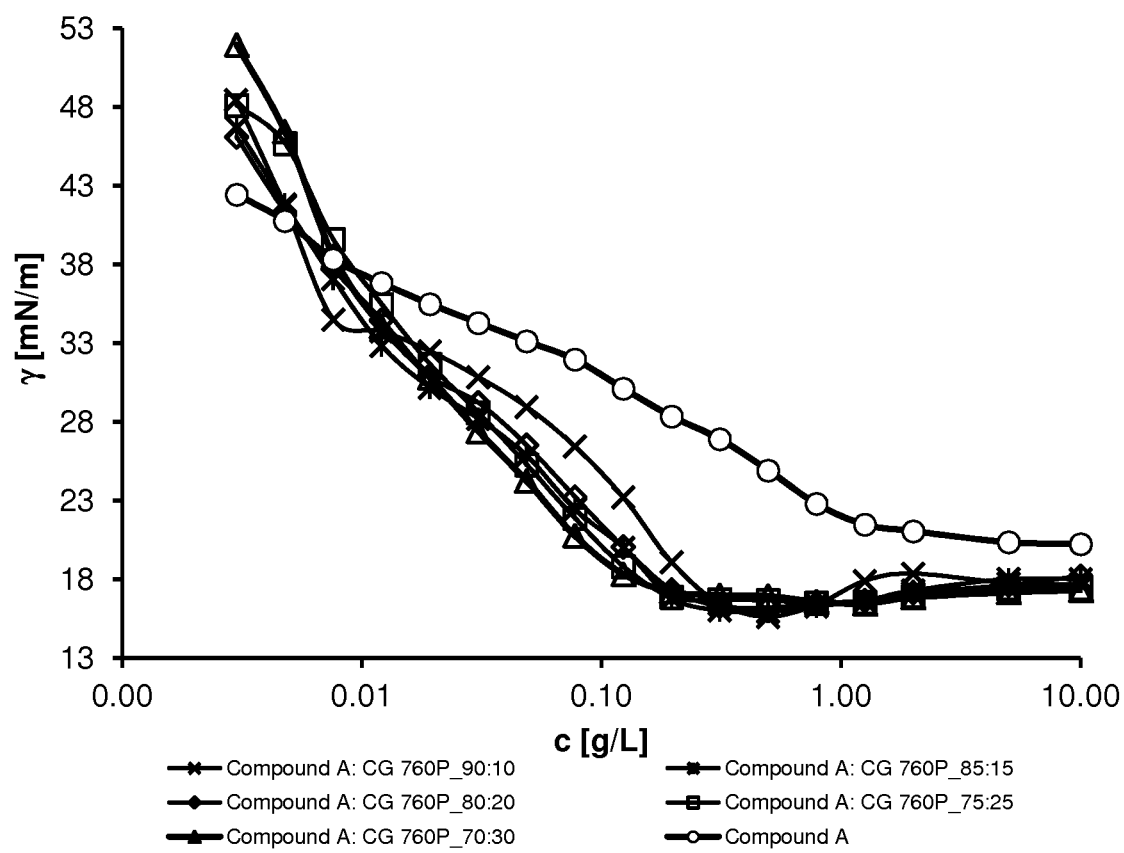
FIG. 1: Static surface tensions $\gamma_{stat.}$ of the mixtures of Example 4

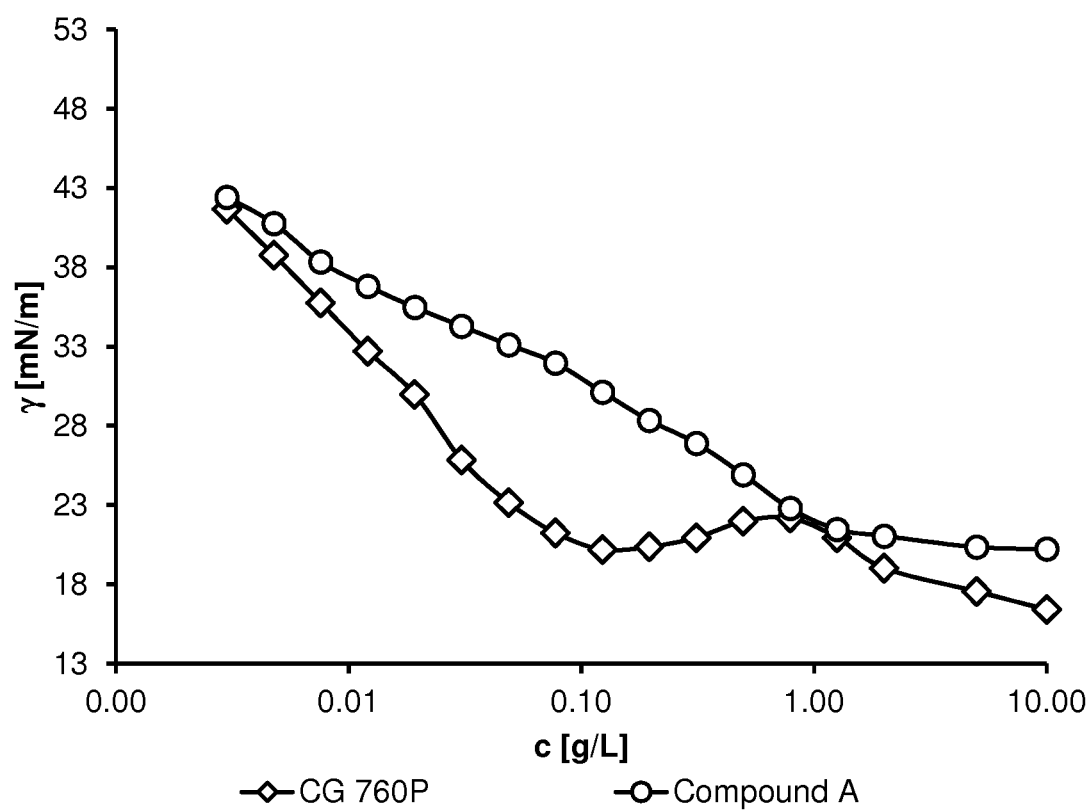
FIG. 2: static surface tensions $\gamma_{stat.}$ of the individual components of Example 4

SURFACTANT MIXTURES

The present invention relates to novel surfactant mixtures, to the use thereof as additives, for example in preparations for surface coating, such as paints, lacquers, protective coatings and special coatings in electronic or in optical applications.

Fluorosurfactants whose static surface tension is very low (16-18 mN/m) can be employed in a very wide variety of applications and contribute, for example, to improved wetting of surfaces. Thus, for example, they are used as interface promoter or emulsifier or viscosity reducer in paints, lacquers or adhesives.

WO 03/010128 describes perfluoroalkyl-substituted amines, acids, amino acids and thioether acids which contain a C3-20-perfluoroalkyl group. JP-A-2001/133984 discloses surface-active compounds containing perfluoroalkoxy chains which are suitable for use in antireflection coatings. JP-A-09/111286 discloses the use of perfluoropolyether surfactants in emulsions. WO 2006/072401 and WO 2010/003567 describe surface-active compounds containing trifluoromethoxy groups.

Specific applications of sulfosuccinates and/or sulfotricarballylates containing various fluorinated side chains are described in U.S. Pat. Nos. 4,968,599 and 4,988,610 and 6,890,608 and in A. R. Pitt et al., Colloids and Surfaces A: Physicochemical and Engineering Aspects, 1996, 114, 321-335; A. R. Pitt, Progr. Colloid Polym. Sci, 1997, 103, 307-317 and Z.-T. Liu et al., Ind. Eng. Chem. Res. 2007, 46, 22-28. Further fluorosurfactants, in particular succinates and tricarballylates containing fluorinated alkyl groups, are described in WO 2009/149807, WO 2010/003567, WO 2010/149262, WO 2011/082770 and WO 2012/084118.

The capability of surfactants is crucially determined by the extent to which and the speed with which the surface tension in a solvent can be reduced. A crucial physical parameter here is the static surface tension $\gamma_{stat.}$ (mN/m). In order to reduce the surface tension, mixtures of fluorosurfactants are also employed besides individual substances. Furthermore, however, there is a need for methods for increasing the capability of surfactants.

Novel surfactant mixtures have now been found with which it is possible to achieve the reduction in the static surface tension $\gamma_{stat.}$ with the lowest possible use concentration. The static surface tension $\gamma_{stat.}$ of surfactant mixtures can be reduced here to a much lower value than the surface tensions of the individual surfactants.

The present invention relates firstly to a surfactant mixture comprising at least one compound A whose dynamic surface tension $\gamma_{dyn.}$ at a use concentration of 0.1% by weight and a bubble lifetime of 100 ms is ≤45 mN/m, and at least one compound B whose static surface tension $\gamma_{stat.}$ is ≤the static surface tension $\gamma_{stat.}$ of compound A.

The compounds A preferably have a dynamic surface tension $\gamma_{dyn.}$ of ≤35 mN/m, in particular ≤30 mN/m, (0.1% by weight and 100 ms).

The compounds B preferably have a static surface tension $\gamma_{stat.}$ of ≤20 mN/m.

The mixture of compounds A having a dynamic surface tension $\gamma_{dyn.}$ of ≤30 mN/m (0.1% by weight and 100 ms) and compounds B having a static surface tension $\gamma_{stat.}$ of ≤20 mN/m is particularly advantageous.

In order to determine the dynamic surface tension $\gamma_{dyn.}$, a 0.1% (percent by weight) aqueous solution of the compound to be investigated is measured by the bubble pressure method at 20° C.±0.2° C. of the measurement solution using a tensiometer. In this method, air bubbles are forced through a capillary into the surfactant solution at different speeds. The dynamic surface tension $\gamma_{dyn.}$ can be determined from the resultant pressure change as a function of the bubble lifetime using the following equation:

$$\gamma = \frac{r(p_{max} - \rho \cdot g \cdot h)}{2}$$

$p_{max}$=maximum pressure, $\rho$=density of the liquid, h=immersion depth, r=radius of the capillary.

In order to determine the static surface tension $\gamma_{stat.}$, a 0.1% (percent by weight) aqueous solution of the compound to be investigated is measured by the Wilhelmy plate method at 20° C.±0.2° C. of the measurement solution and a platinum plate having a length of 19.9 mm using a tensiometer. In this method, the surface or interfacial tension of the surfactant solution is calculated from the force acting on the wetted length of a plate, in accordance with the following formula.

$$\gamma = \frac{F}{L \cdot \cos\theta} = \frac{F}{L}$$

$\gamma$=interfacial or surface tension; F=force acting on the balance; L=wetted length (19.9 mm); $\theta$=contact angle.

The plate consists of roughened platinum and is thus optimally wetted, so that the contact angle $\theta$ is close to 0°. The term $\cos\theta$ therefore approximately reaches the value 1, so that only the measured force and the length of the plate have to be taken into account.

Surprisingly, it has been found that the specific surfactant mixtures of the invention can preferably reduce the static surface tension $\gamma_{stat.}$ to a lower value than the individual surfactants are capable of doing.

The lowest surface tension to be achieved is usually achieved by the surfactant which reduces the surface tension the most. This observation results from the thermodynamic law that the more surface-active substance makes the greatest contribution to minimisation of the overall energy ($\Delta G < 0$). The mixing ratio of two or more surfactants is not crucial here for the resultant surface tension of a mixture, since over an extended period, the surfactant which has the lowest surface tension always accumulates at the interface.

It is therefore surprising that the novel surfactant mixtures, in particular the preferred surfactant mixtures mentioned below, are able to exhibit a synergistic effect with respect to the reduction in the static surface tension $\gamma_{stat.}$.

Preference is given to surfactant mixtures in which at least one of the compounds A or B is a fluorosurfactant. Particular preference is given to surfactant mixtures in which at least one of the compounds A and at least one of the compounds B is a fluorosurfactant.

Particularly preferred surfactant mixtures of the present invention are mixtures comprising at least one compound of the formula (I)

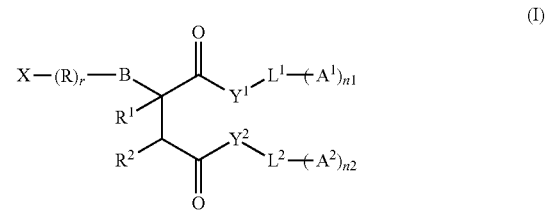

where
X is a hydrophilic group,
R is linear or branched alkylene, where one or more non-adjacent C atoms may be replaced by O, S, and/or N,
r is 0 or 1,
B is a single bond, O, NH, NR', $CH_2$, C(O)—O, S, $CH_2$—O, O—C(O), O—C(O)O, N—C(O), C(O)—N, O—C(O)—N, N—C(O)—N, $SiR'_2$—, $SiR'_2$—O, O—$SO_2$ or $SO_2$—O, where R' is linear or branched alkyl,
$R^1$ and $R^2$ are, independently of one another, hydrogen or —$CH_2$—$COY^3$-$L^3$-$(A^3)_{n3}$,
$Y^1$, $Y^2$ and $Y^3$ are, independently of one another, O, S or N,
$L^1$, $L^2$ and $L^3$ are, independently of one another, linear or branched alkylene, where one or more non-adjacent C atoms may be replaced by O, S, and/or N,
$A^1$, $A^2$ and $A^3$ are, independently of one another, hydrogen or a group of the structure —$Z^i(CR^3R^4)_{mi}Rf$, where i=1, 2 or 3,
$Z^i$ is O, S or N and is bonded to a C atom of $L^i$ or is a single bond,
$R^3$ and $R^4$ are, independently of one another, hydrogen or an alkyl group,
$Rf$ is a fluorine-containing radical,
n1, n2 and n3 are, independently of one another, 1-6,
m1, m2 and m3 are, independently of one another, 0-5
and the compounds of the formula (I) contain at least one $Rf$ group.

Preference is furthermore given to surfactant mixtures which comprise at least one compound of the formula (II)

$$(RF\text{-}(spacer)_m)_n M \qquad (II)$$

where
RF is a fluorine-containing group,
spacer is a single bond or an organic functional carbon chain,
n is ≥1,
m=0-1 and
M is an anionic, cationic, amphoteric or nonionic group.

Especial preference is given to surfactant mixtures which comprise at least one compound of the formula (I) and at least one compound of the formula (II).

Preferred compounds of the formula (I) are those in which two or three $Rf$ groups are present. However, compounds containing at least four $Rf$ groups are also possible, preferably containing four, six or nine $Rf$ groups.

The fluorinated groups $Rf$ used are preferably branched or unbranched, fluorine-containing alkyl radicals, in particular perfluorinated alkyl radicals. Particular preference is given to fluorine-containing alkyl radicals having 1 to 10, preferably 1 to 6, in particular 1 to 4, C atoms. Especial preference is given to the use of perfluorinated $Rf$ groups having 1 to 6, in particular 1 to 4, C atoms. $Rf^1$, $Rf^2$ and $Rf^3$ preferably have the same meaning.

$R^1$ and $R^2$ are preferably not simultaneously —$CH_2$—$COY^3$-$L^3$-$(A^3)_{n3}$.

Preferred compounds of the formula (I) are in addition those in which $Y^1$, $Y^2$ and $Y^3$ preferably denote O or N, in particular O. $Y^1$ and $Y^2$ or $Y^1$, $Y^2$ and $Y^3$ preferably have the same meaning.

The groups $Rf$ are bonded to a group $L^1$, $L^2$ or $L^3$ via a —$Z^i(CR^3R^4)_{mi}$ group. $Z^i$ here preferably stands for O or N, in particular for O. Preference is given to compounds in which all $Z^i$ are identical.

Preferred compounds of the formula (I) are those in which n1, n2 and n3 are preferably, independently of one another, 0-4, in particular 1 or 2.

Preferred compounds of the formula (I) are also those in which m1, m2 and m3 are preferably, independently of one another, 0-4, in particular 1-4.

Preferred compounds of the formula (I) are also those in which $R^3$ and $R^4$ are, independently of one another, hydrogen or an alkyl group having 1 to 6 C atoms, in particular 1-4 C atoms. $R^3$ and $R^4$ preferably stand, independently of one another, for hydrogen or an unbranched C1-C3-alkyl group. Preference is given to compounds in which $R^3$ or $R^4$ is equal to hydrogen. m1, m2 and m3 preferably stand, independently of one another, for 1-3. Preference is given to compounds in which all $Z^i$, $R^3$, $R^4$ and mi in each case have the same meaning.

$L^1$, $L^2$ and $L^3$ can preferably, independently of one another, be linear or branched alkylene having 1 to 10 C atoms. In particular, $L^1$, $L^2$ and $L^3$ are, independently of one another, linear or branched alkylene having 3 to 8 C atoms. One or more non-adjacent C atoms of the groups $L^1$, $L^2$ and $L^3$ may preferably be replaced by O or N, preferably by O. In a preferred variant of the invention, $L^1$ and $L^2$ are identical. If $L^3$ is also present, $L^1$ and $L^2$ or $L^1$ and $L^3$ or $L^2$ and $L^3$ may preferably be identical. In a particularly preferred variant of the invention, all groups $L^1$, $L^2$ and $L^3$ are identical.

Particular preference is given to compounds of the formula (I) in which at least one group $L^i$=—$(CR^5R^6)_{ci}(CR^7R^8)_{c'i}$—$_{di}$—, where the respective indices ci and c'i are, independently of one another, 0-10 and di is 0-5, $R^5$ to $R^8$ are, independently of one another, hydrogen or a branched or unbranched alkyl group and ci and c'i are not simultaneously 0.

Especial preference is given to compounds of the formula (I) in which, in at least one group $L^i$, the group $R^5$ is an alkyl group having 1 to 6 C atoms, in particular 1-4 C atoms, and the groups $R^6$ and $R^7$ and $R^8$ are hydrogen.

Preference is furthermore also given to compounds of the formula (I) in which $R^7$ is an alkyl group having 1 to 6 C atoms, in particular 1-4 C atoms, and the groups $R^5$ and $R^6$ and $R^8$ are hydrogen.

In the compounds of the formula (I), the group R preferably stands for linear or branched alkylene having 1 to 12 carbon atoms, in particular having 1 to 4 carbon atoms. One or more non-adjacent C atoms may preferably be replaced by O or S, preferably O.

In the compounds of the formula (I) according to the invention, r can preferably be equal to 0.

Preference is furthermore given to compounds of the formula (I) in which B is a single bond, O, S, C(O)—O or O—C(O), in particular a single bond.

Particularly advantageous compounds of the formula (I) are those in which one or more of the variables $Rf^i$, $Y^i$, $Z^i$, $L^i$, $R^1$ to $R^8$, ci, c'i, di, ni, mi, R, r and B have the preferred meanings, in particular compounds in which the said variables have the particularly preferred meanings. Particularly advantageous compounds of the formula (I) are those in which all the said variables have the preferred meanings, in particular the particularly preferred meanings.

In the compounds of the formula (I) according to the invention, X is a hydrophilic group, preferably an anionic, cationic, nonionic or amphoteric group.

A preferred anionic group X can be selected from —$COO^-$, —$SO_3^-$, —$OSO_3^-$, —$PO_3^{2-}$, —$OPO_3^{2-}$, —$(OCH_2CH_2)_s$—O—$(CH_2)_t$—$COO^-$, —$(OCH_2CH_2)_s$—O—$(CH_2)_t$—$SO_3^-$, —$(OCH_2CH_2)_s$—O—$(CH_2)_t$—$OSO_3^-$, —$(OCH_2CH_2)_s$—O—$(CH_2)_t$—$PO_3^{2-}$, —$(OCH_2CH_2)_s$—O—$(CH_2)_t$—$OPO_3^{2-}$ or from the formulae A to C,

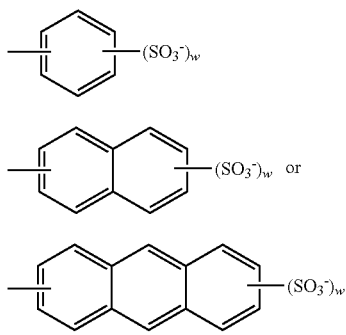

A

B

C where s stands for an integer from the range from 1 to 1000, t stands for an integer selected from 1, 2, 3 or 4 and w stands for an integer selected from 1, 2 or 3.

The preferred anionic groups here include, in particular, —COO$^-$, —SO$_3^-$, —OSO$_3^-$, —PO$_3^{2-}$, —OPO$_3^{2-}$, the sub-formula A, and —(OCH$_2$CH$_2$)$_s$—O—(CH$_2$)$_t$—COO$^-$, —(OCH$_2$CH$_2$)$_s$—O—(CH$_2$)$_t$—SO$_3^-$ and —(OCH$_2$CH$_2$)$_s$—O—(CH$_2$)$_t$—OSO$_3^-$, where each individual one of these groups may be preferred per se.

The very particularly preferred anionic groups here include —SO$_3^-$, —OSO$_3^-$, —PO$_3^{2-}$ or OPO$_3^{2-}$. Especial preference is given to a sulfonate group —SO$_3^-$.

The preferred counterion for anionic groups X is a monovalent cation, in particular H$^+$, an alkali metal cation or NR$_4^+$, where R is H or C1-C6-alkyl and all R may be identical or different. Particular preference is given to Na$^+$, K$^+$ and NH$_4^+$, especially preferably Na$^+$.

A preferred cationic group X can be selected from —NR$^1$R$^2$R$^{3+}$Z$^-$, —PR$^1$R$^2$R$^{3+}$Z$^-$,

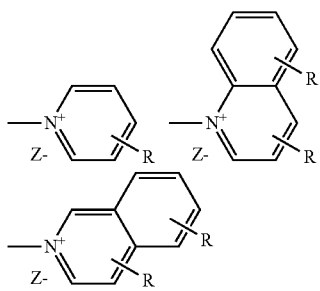

where R stands for H or C$_{1-4}$-alkyl in any desired position, Z$^-$ stands for Cl$^-$, Br$^-$, I$^-$, CH$_3$SO$_3^-$, CF$_3$SO$_3^-$, CH$_3$PhSO$_3^-$, PhSO$_3^-$ R$^1$, R$^2$ and R$^3$ each stand, independently of one another, for H, C$_{1-30}$-alkyl, Ar or —CH$_2$Ar and Ar stands for an unsubstituted or mono- or polysubstituted aromatic ring or condensed ring systems having 6 to 18 C atoms in which, in addition, one or two CH groups may be replaced by N.

The preferred cationic groups here include, in particular, —NR$^1$R$^2$R$^{3+}$Z and

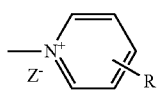

where each individual one of these groups may be preferred per se.

A preferred nonionic group can be selected from linear or branched alkyl, where one or more non-adjacent C atoms may be replaced by O, S, and/or N, —OH, —SH, —O-(glycoside)$_o$, —S-(glycoside)$_o$, —OCH$_2$—CHOH—CH$_2$—OH, —OCH$_2$Ar(—NCO)$_p$, —OAr(—NCO)$_p$, —CR═CH$_2$, —OCOCR═CH$_2$, amine oxide,

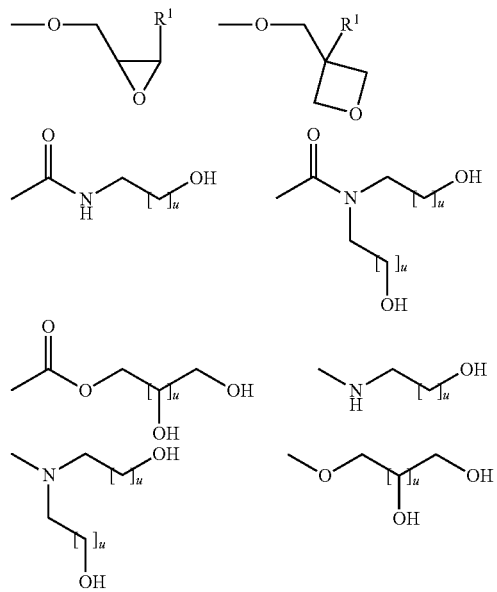

u stands for an integer from the range from 1 to 6, preferably 1 to 4, o stands for an integer from the range from 1 to 10, p stands for 1 or 2, R$^1$, R$^2$ and R$^3$ each stand, independently of one another, for C$_{1-30}$-alkyl, Ar or —CH$_2$Ar, preferably C$_{1-20}$-alkyl, and, Ar stands for an unsubstituted, mono- or polysubstituted aromatic ring or condensed ring systems having 6 to 18 C atoms in which, in addition, one or two CH groups may be replaced by C═O, and, glycoside stands for an etherified carbohydrate, preferably for a mono-, di, tri- or oligoglucoside, and R stands for H or methyl.

The preferred nonionic groups here include, in particular, linear or branched alkyl, where one or more non-adjacent C atoms may be replaced by O, S and/or N, —OH, —OCOCR═CH$_2$ and —O-(glycoside)$_o$.

If X=alkyl, where one or more non-adjacent C atoms have been replaced by O, S and/or N, it is then preferably equal to R—(B-A)$_m$-, where R═H or C$_{1-4}$-alkyl, in particular H or CH$_3$, A=linear or branched alkylene, preferably having 1 to 10 carbon atoms, in particular having 1 to 4 carbon atoms, B═O or S, preferably O, and m=an integer preferably from the range from 1 to 100, particularly preferably 1 to 30.

The nonionic group X is particularly preferably the R—(O—CH$_2$CHR)$_m$— group, where m=an integer from the range from 1 to 100, preferably 1 to 30, in particular 1-15, and R═H or C$_{1-4}$-alkyl, in particular H or CH$_3$. R—(B-A)$_m$- is particularly preferably a polyethylene or polypropylene glycol unit.

A preferred amphoteric group can be selected from the functional groups of the acetyldiamines, the N-alkylamino acids, the betaines or corresponding derivatives, in particular selected from:

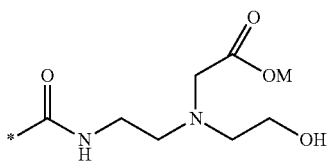
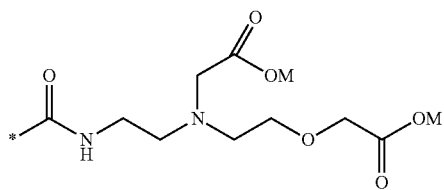
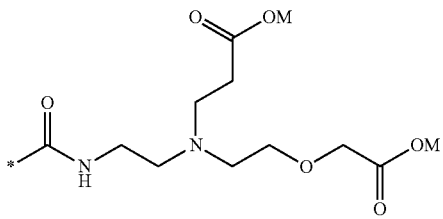

—NH—CH$_2$—COOM;   —NH—CH$_2$—CH$_2$—COOM

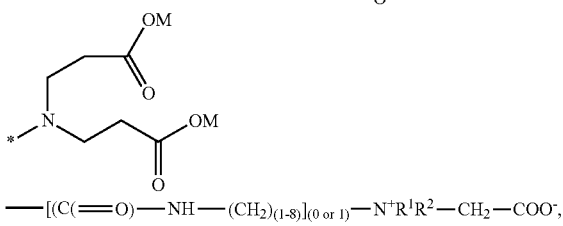

—[(C(═O)—NH—(CH$_2$)$_{(1\text{-}8)}$]$_{(0\text{ or }1)}$—N$^+$R$^1$R$^2$—CH$_2$—COO$^-$, where R$^1$ and R$^2$ each stand, independently of one another, for a C1-8-alkyl radical, preferably methyl or ethyl —C(═O)—NH—(CH$_2$)$_{1\text{-}3}$—N$^+$R$^1$R$^2$—CH$_2$—CH(OH)—CH$_2$—(O)$_{(0\text{ or }1)}$—(S or P)O$_3^-$, where R$^1$ and R$^2$ each stand, independently of one another, for a C1-8-alkyl radical, preferably methyl or ethyl Particularly preferred compounds according to the invention are those which contain one of the preferred anionic groups X, the preferred nonionic groups or the preferred zwitterionic groups as hydrophilic group X.

Especial preference is given to compounds which contain the groups —SO$_3^-$, —OSO$_3^-$, —PO$_3^{2-}$ or OPO$_3^{2-}$, polyethylene glycol or polypropylene glycol, betaines, or sulfobetaines, in particular —SO$_3^-$. Preferred counterions here are Na$^+$, K$^+$ and NH$_4^+$, in particular Na$^+$.

Compounds of the formula (I) in which X is an anionic group, in particular —SO$_3^-$, and one or more of the variables Rf$^i$, Y$^i$, Z$^i$, L$^i$, R$^1$ to R$^8$, ci, c'i, di, ni, mi, R, r and B have the preferred meanings described, in particular compounds in which the said variables have the particularly preferred meanings, are particularly advantageously employed in the novel surfactant mixtures. Preferred compounds here are, in particular, compounds in which all variables have the preferred meanings, especially the particularly preferred meanings.

In an embodiment of the invention, the compounds of the formula (I) can be in the form of mixtures in which the individual compounds have different meanings for the variables, in particular for A$^i$, Rf$^i$, Y$^i$, Z$^i$, L$^i$, R$^1$ to R$^8$, ci, c'i, di and mi.

In a particularly preferred group of compounds of the formula (I), R$^1$ and R$^2$ stand for hydrogen and A$^1$ and A$^2$ stand for a —Z$^i$(CR$^3$R$^4$)$_{mi}$Rf$^i$ group. These compounds are represented by formula (III). Particular preference is given to compounds of the formula (III) where Y$^1$, Y$^2$, Z$^1$ and Z$^2$ are equal to O.

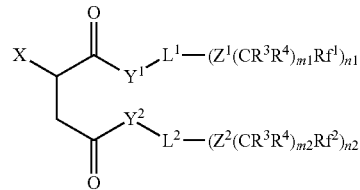

In another preferred group of compounds of the formula (I), R$^1$ stands for H, R$^2$ stands for —CH$_2$—COY$^3$-L$^3$-(A$^3$)$_{n3}$ and A$^1$, A$^2$ and A$^3$ stand for a —Z$^i$(CR$^3$R$^4$)$_{mi}$Rf$^i$ group. These compounds are represented by formula (IV). Particular preference is given to compounds of the formula (IV) where Y$^1$, Y$^2$, Y$^3$, Z$^1$, Z$^2$ and Z$^3$ are equal to O.

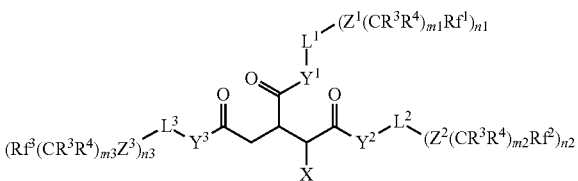

In a further preferred group of compounds of the formula (I), R$^1$ stands for —CH$_2$—COY$^3$-L$^3$-(A$^3$)$_{n3}$, R$^2$ stands for hydrogen and A$^1$, A$^2$ and A$^3$ stand for a —Z$^i$(CR$^3$R$^4$)$_{mi}$Rf$^i$ group. These compounds are represented by formula (V). Particular preference is given to compounds of the formula (V) where Y$^1$, Y$^2$, Y$^3$, Z$^1$, Z$^2$, and Z$^3$ are equal to O.

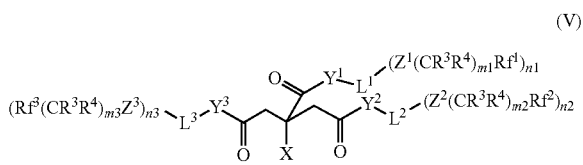

(V)

Particularly preferred compounds according to the invention are compounds of the formulae (III), (IV) and (V) in which X is an anionic group. Especial preference is given to compounds of the formulae (III), (IV) and (V) which contain the groups —$SO_3^-$, —$OSO_3^-$, —$PO_3^{2-}$ or $OPO_3^{2-}$, in particular —$SO_3^-$. Preferred counterions here are $Na^+$, $K^+$ and $NH_4^+$, in particular $Na^+$.

In the formulae (III), (IV) and (V), $L^1$, $L^2$ and $L^3$ have the general and preferred meanings given for the formula (I). $L^1$, $L^2$ and $L^3$ are preferably, independently of one another, equal to linear or branched C1-C10-alkylene, in particular linear or branched C3-C8-alkylene, preferably equal to linear or branched C3-C6-alkylene. Especial preference is given to compounds of the formulae (III), (IV) and (V) in which all L are identical.

In addition, preference is given to compounds of the formulae (III), (IV) and (V) containing perfluorinated groups Rf having 1 to 4 C atoms. $Rf^1$, $Rf^2$ and $Rf^3$ preferably have the same meaning.

In the formulae (III), (IV) and (V), n1, n2 and n3 are preferably, independently of one another, 1 or 2. m1, m2 and m3 are preferably, independently of one another, 1-4.

Preferred compounds of the formulae (III), (IV) and (V) are also those in which $R^3$ and $R^4$ are, independently of one another, hydrogen or an alkyl group having 1 to 3 C atoms.

In a preferred variant, $R^3$ and $R^4$ are identical. Preference is furthermore given to compounds in which $R^3$ or $R^4$ are equal to hydrogen and m1, m2 and m3 are equal to 1-3.

Preference is given to compounds in which all $Rf^i$, $R^3$, $R^4$, ni and mi in each case have the same meaning.

Particular preference is given to compounds of the formulae (III), (IV) and (V) in which all variables have the preferred meanings, in particular the particularly preferred meanings.

Examples of compounds of the formula (I) whose use in the novel surfactant mixtures is particularly advantageous are compounds of the formulae (IV-1) and (IV-2):

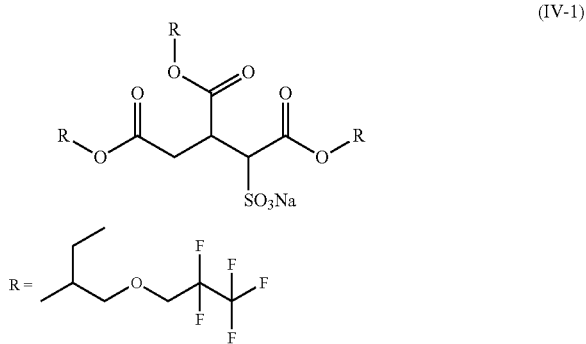

(IV-1)

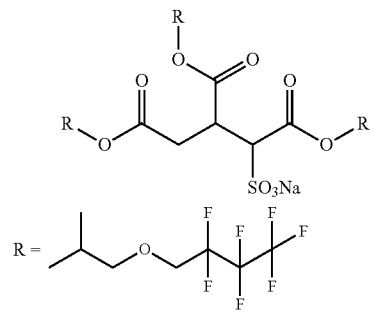

(IV-2)

The present invention also relates to the compounds of the formulae (IV-1) and (IV-2) and the use thereof as surfactants in general or in the areas of use described below and to corresponding compositions comprising the compounds.

The compounds of the formula (I) according to the invention may also be in the form of isomer mixtures (constitutional and/or configurational isomer mixtures). In particular, diastereomer and/or enantiomer mixtures are possible.

The compounds of the formula (I) according to the invention can preferably be prepared by esterification of maleic acid and aconitic acid or anhydrides or acid chlorides thereof using one or more alcohols of the formula (VI)

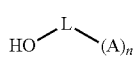

(VI)

and subsequent addition onto the double bond in order to introduce the X—(R)$_r$—B group. The compounds according to the invention can also preferably be prepared by esterification of hydroxysuccinic acid and citric acid using one or more alcohols of the formula (VI) and subsequent functionalisation of the hydroxyl groups in order to introduce the X—(R)$_r$—B group.

L and A in the formula (VI) have the meaning described for $L^1$, $L^2$ and $L^3$ and $A^1$, $A^2$ and $A^3$ respectively in formula (I), in particular also the preferred meanings. The alcohols of the formula (VI) may contain one or more Rf groups.

The alcohols used are commercially available and/or their preparation is familiar to the person skilled in the art (for example DE 10 2009 030 846 A1; Heilmann et al. J. Fluorine Chem. 1992, 59, 387; Janulis et al. U.S. Pat. No. 5,157,159 (1992); Carbohydrate Research 1991, 219, 33).

The synthesis of succinates or tricarballylates according to the invention is preferably carried out in a two-step synthesis via the corresponding maleates or hydroxysuccinates or the corresponding aconitic or citric acid esters. These syntheses are described in WO 2010/003567, WO 2010/149262, WO 2011/082770 and WO 2012/084118. The disclosures in the references cited hereby expressly also belong to the disclosure content of the present application.

Preferred compounds of the formula (II) are those in which RF is a perfluorinated alkyl group having at least two C atoms, preferably three C atoms, in particular four C atoms. Especial preference is given to substances which contain a perfluorinated C6 chain connected to an ethyl radical.

The spacer group can preferably be an organic functional hydrocarbon chain, for example a linear or branched alkylene, where one or more non-adjacent C atoms may be replaced by O, S, and/or N.

Preference is furthermore given to compounds of the formula (II) in which the (RF-(spacer)$_m$)$_n$— group is equal to $C_nF_{2n'+1}$—, $C_nF_{2n'+1}$—$CH_2CH_2$—, $C_nF_{2n'+1}$—$OCF_2CF_2$, $C_nF_{2n'+1}$—$OC_6H_4$—, $C_nF_{2n'+1}$—$C(O)NH(CH_2)_3N$=, $C_nF_{2n'+1}$—$SO_2NH(CH_2)_3N$=, $CF_3CCl_2$ $(CF_2CFCl)_{n-1}$—$CF_2$— or $C_8F_{17}CH_2CH_2Si(CH_3)_2$—, where n'=4-12. Particular preference is given to the $C_nF_{2n'+1}$—$CH_2CH_2$— group where n'=4-8.

Preferred anionic groups M are —OPOO$^-$, —COO$^-$, —SO$_3^-$, —OSO$_3^-$, —OP(O)(O$^-$)O— and —OP(O)O$_2^{2-}$. The counterions used here are preferably H$^+$, Na$^+$, K$^+$, Li$^+$ or NH$_4^+$.

Particular preference is given to compounds of the formula (II-a)

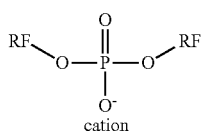

(II-a)

where RF=CF$_3$—(CF$_2$)$_n$-spacer-, where n=0-12, and cation=Na, K, Li, NH$_4$. Spacer has the meaning indicated above.

Preferred cationic groups M are —NR$_3^+$ groups where R=C1-C4 alkyl.

Preferred amphoteric groups M are —NR$_2^+$—(CH$_2$)$_y$—COO$^-$ groups where R=C1-C4 alkyl and y=1-3, preferably y=1.

Preferred nonionic groups M are (OCH$_2$CH$_2$)$_n$—OR and —(OCH$_2$(CH$_3$)CH$_2$)$_n$—OR where n=4-40 and R=H or C1-C4 alkyl.

Preferred compounds of the formula (II) are, in particular, compounds in which all variables have the preferred meanings. Preference is given to anionic fluorosurfactants, for example based on phosphoric acid, carboxyl and sulfonic acid groups. Especial preference is given to compounds of the formula (II) in which M is an anionic group and the (RF-(spacer)$_m$)$_n$— group is equal to $C_nF_{2n'+1}$—$CH_2CH_2$—, where n=4-8. Particularly preferred compounds here are phosphoric acid esters of the formula (II-a), especially those with NH$_4^+$ as counterion.

The compounds of the formula (II) employed in the novel surfactant mixtures are known to the person skilled in the art. They can be prepared analogously to known synthetic processes or are commercially available. The phosphoric acid esters which are particularly preferably used are available, for example, from Chemguard under the trade name Chemguard®, for example Chemguard® S760-P.

The novel surfactant mixtures may also comprise at least one sulfosuccinate, preferably of the formula (VII),

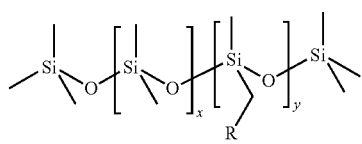

(VII)

The novel surfactant mixtures may also comprise at least one functional polymer based on polymethylsiloxane, preferably of the formula (VIII),

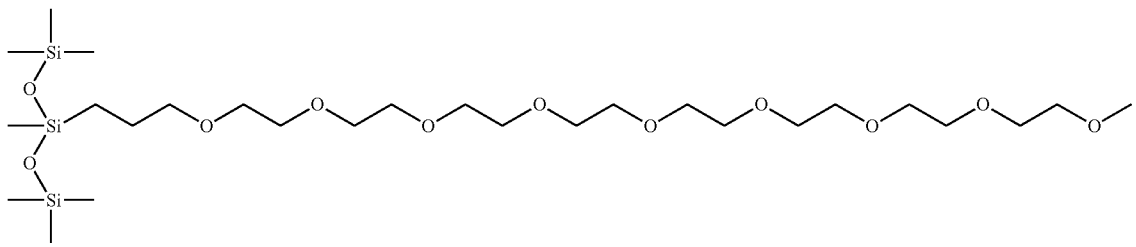

(VIII)

where x=1-500, y=1-500 and R=phenyl, methyl or —(O—C$_2$H$_3$R')$_{n''}$—OR'', where n''=1-1000, R'=linear and branched alkyl radical and R''=linear and branched alkyl radicals.

The novel surfactant mixtures may also comprise at least one trisiloxane derivative, preferably of the formula (IX), $$M_2(D'E_{n'''})PM \quad (IX)$$

where M=(CH$_3$)$_3$SiO—, D'=Si(CH$_3$)(R'''), E=OCH$_2$CH$_2$, n'''=5-40 and P=OH, OMe, or OAc, where R'''=linear and/or branched alkyl chain. Especial preference is given to the following compound The novel surfactant mixtures may also comprise at least one gemini surfactant, where two identical or different amphiphilic groups built up from structures of conventional surfactants are connected by a spacer. Especial preference is given, for example, to diacetylene derivatives of the formula (X)

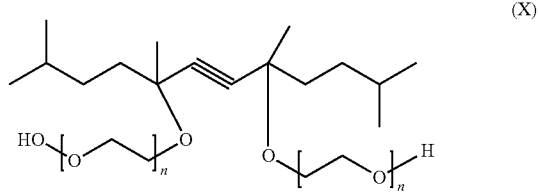

(X)

where n=1-100.

The surfactant mixtures of the invention may preferably comprise compounds of the formula (I) as compounds A and compounds of the formulae (II)-(X) as compounds B, in particular those of the formula (II).

Preferred surfactant mixtures of the invention comprise the preferred compounds of the formula (I) described above and the preferred compounds of the formula (II) described above. In another preferred variant of the invention, the surfactant mixtures comprise compounds of the formula (I) both as compounds A and as compounds B.

Especial preference is given to surfactant mixtures comprising fluorosurfactants of the formulae (III), (IV) and (V), especially of the formulae (IV-1) and/or (IV-2), preferably in combination with the said preferred phosphoric acid esters.

Besides the compounds A and B or preferably the compounds of the formulae (I) and (II), the mixtures according to the invention may also comprise solvents, additives, assistants and fillers as well as unfluorinated surfactants. The following may be mentioned by way of example: silicone particles and surface-modified pigments, plasticisers.

The novel surfactant mixtures preferably comprise the compounds A and B in the ratio A/B 10:90 to 90:10, preferably 70/30 to 90/10, in particular in the ratio 80/20 to 85/15 (weight ratio). The novel surfactant mixtures particularly preferably comprise the compounds of the formulae (I) and (II) in the ratio 10:90 to 90:10, preferably 70/30 to 90/10, in particular in the ratio 80/20 to 85/15 (weight ratio).

The content of the compounds A and B or of the compounds of the formulae (I) and (II) in solvent-containing surfactant mixtures is usually 5-50% by weight, preferably 30-35% by weight, based on the entire surfactant mixture.

The mixtures preferably comprise compounds (I) and (II) and a solvent. The mixtures particularly preferably consist of the compounds (I) and (II) and a solvent or solvent mixture. In particular, the compounds and solvents described as preferred are employed here, preferably in the said amounts and weight ratios.

It is a particular advantage of the surfactant mixtures according to the invention that they facilitate the reduction in the static surface tension $\gamma_{stat.}$ with the lowest possible use concentration (0.01-1.0% by weight, based on the entire formulation, for example a surface-coating formulation) of the surfactants. Surprisingly, the novel surfactant mixtures additionally exhibit a synergistic effect with respect to the reduction in the static surface tension $\gamma_{stat.}$. An essential characteristic of the surfactant mixtures according to the invention is thus that the static surface tension $\gamma_{stat.}$ of the surfactant mixtures is lower than the static surface tensions $\gamma_{stat.}$ of the individual surfactants of the formulae (I) and (II). Particularly preferred surfactant mixtures having a synergistic effect comprise at least one compound of the formulae (III), (IV) and/or (V) and at least one compound of the formula (II) from the class of the phosphoric acid esters. Synergistic effects in the range 0.4-1.9 mN/m can be achieved in various mixing ratios. The novel surfactant mixtures may additionally have further advantages, such as, for example, biological and/or abiotic degradability of the substances without the formation of persistent perfluorinated degradation products, such as PFOA (perfluorooctanoic acid) or PFOS (perfluorooctanesulfonic acid), weak foam formation, good processability in formulations and/or storage stability.

The present invention relates secondly to the use of surfactant mixtures in accordance with Claim 1 and the preferred embodiments described above as surface-active agents, for example for improving the flow behaviour and wetting capacity of coating formulations. Surfactant mixtures which comprise fluorosurfactants of the formulae (III), (IV) and (V) in combination with the said preferred phosphoric acid esters are preferably used, in particular those which consist of these components and a solvent or solvent mixture.

Areas of use are, for example, the use of the surfactant mixtures and surfactants according to the invention as additives in preparations for surface coating, such as paints, lacquers, protective coatings, special coatings in electronic or semiconductor applications (for example photoresists, top antireflective coatings, bottom antireflective coatings) or in optical applications (for example photographic coatings, coatings of optical elements), in agrochemicals, in polishes and waxes, for example for furniture, floorcoverings and automobiles, in particular in floor polishes, in adhesives, in fire-extinguishing agents, lubricants, washing agents and detergents, de-icers or in photolithographic processes, in particular in immersion photolithography processes, for example in developer solutions, rinse solutions, immersion oils and/or in the photoresists themselves, especially for the production of printed circuits, such as, for example, IC, LSI, VLSI and ULSI, or in additive preparations for addition of additives to corresponding preparations.

The surfactant mixtures and surfactants according to the invention are, for use, usually introduced into correspondingly designed preparations. The present invention likewise relates to corresponding compositions comprising the surfactant mixtures and surfactants according to the invention. Such compositions preferably comprise a vehicle which is suitable for the respective application, and optionally further active substances and/or optionally assistants. Preferred compositions are paint and coating preparations, adhesives, fire-extinguishing agents, lubricants, washing agents and detergents and de-icers or developer solutions, rinse solutions, immersion oils and photoresists for photolithographic processes, agrochemicals, floor polishes or hydrophobicisation agents for textile finishing or glass treatment. Preferred compositions here are paint and coating preparations and printing inks.

In addition, the present invention also relates to water-based surface-coating formulations which comprise the surfactant mixtures and surfactants according to the invention, alone or mixed with additives. Preference is given to the use of preparations, for example surface-coating formulations based on the following synthetic film formers: polycondensation resins, such as alkyd resins, saturated/unsaturated polyesters, polyamides/imides, silicone resins, phenolic resins, urea resins and melamine resins, polyaddition resins, such as polyurethanes and epoxy resins, polymerisation resins, such as polyolefins, polyvinyl compounds and polyacrylates.

In addition, the surfactant mixtures and surfactants according to the invention are also suitable for use in lacquers based on natural products and modified natural products. Preference is given to lacquers based on oils, polysaccharides, such as starch and cellulose, and also based on natural resins, such as cyclic oligoterpenes, polyterpenes and/or shellac.

The surfactant mixtures and surfactants according to the invention can be used both in physically hardening (thermoplastics) and in crosslinking (elastomers and thermosets) aqueous surface-coating systems. The surfactant mixtures and surfactants according to the invention preferably improve the flow and wetting properties of the surface-coating systems.

The present invention relates to all uses mentioned here of surfactant mixtures or surfactants to be employed in accordance with the invention. The respective use of surfactant mixtures or surfactants for the said purposes is known to the person skilled in the art, and consequently the use of the surfactant mixtures and surfactants to be employed in accordance with the invention presents no problems.

The complete disclosure contents of all applications and publications mentioned are incorporated into this application by way of reference. For the present invention, both the plural form of a term and also the singular form of a term also means the respective other form, unless expressly indicated otherwise. All features of the present invention can be combined with one another in any way, unless certain features are mutually exclusive. This applies, in particular, to preferred and particularly preferred features. Further features, advantages and variants of the invention also arise from the claims and examples. The following examples explain the present invention in greater detail without restricting the scope of protection.

EXAMPLES

Determination of the Static Surface Tension

The static surface tensions $\gamma_{stat.}$ of aqueous surfactant solutions having various concentrations c (grams per litre) are determined.

Instrument: Dataphysics tensiometer (model DCAT 11)
Temperature of the measurement solutions: 20°±0.2° C.
Measurement method employed: measurement of the surface tension using the Wilhelmy plate method in accordance with DIN EN 14370.
Plate: platinum, length=19.9 mm In the plate method, the surface or interfacial tension of the surfactant solution is calculated from the force acting on the wetted length of a plate, in accordance with the following formula:

$$\gamma = \frac{F}{L \cdot \cos\theta} = \frac{F}{L}$$

γ=interfacial or surface tension; F=force acting on the balance; L=wetted length (19.9 mm); θ=contact angle.

The plate consists of roughened platinum and is thus optimally wetted so that the contact angle θ is close to 0°. The term cos θ therefore approximately reaches the value 1, so that only the measured force and the length of the plate have to be taken into account.

Determination of the Dynamic Surface Tension

The dynamic surface tension $\gamma_{dyn.}$ of a 0.1% (percent by weight) aqueous solution of the compound to be investigated is determined.

Measurement method employed: measurement of the surface tension using the bubble pressure method
Instrument: SITA tensiometer (model t 60)
Temperature of the measurement solutions: 20° C.±0.2° C.

In the measurement of the dynamic surface tension $\gamma_{dyn.}$, air bubbles are forced through a capillary into the surfactant solution at different speeds. The surface tension can be determined from the resultant pressure change as a function of the bubble lifetime using the following equation:

$$\gamma = \frac{r(p_{max} - \rho \cdot g \cdot h)}{2}$$

$p_{max}$=maximum pressure, ρ=density of the liquid, h=immersion depth, r=radius of the capillary.

Example 1: Synthesis of the Compound of the Formula (IV-1)

The chain-extended alcohol is prepared from the starting materials 2,2,3,3,3-pentafluoropropan-1-ol (ABCR) and butylene carbonate (TCI) in accordance with Patent Application DE 10 2009 030 846 A1. This intermediate is esterified using aconitic acid (Alfa Aesar) by the synthetic procedure described and then sulfonated in the final reaction step by means of an aqueous sodium hydrogensulfite solution (Merck). The dynamic surface tension $\gamma_{dyn.}$ is determined by the method indicated and is 28.2 mN/m (100 ms, 0.1% by weight).

Example 2: Synthesis of the Compound of the Formula (IV-2)

The chain-extended alcohol is prepared from the starting materials 2,2,3,3,4,4,4-heptafluorobutan-1-ol (ABCR) and propylene carbonate (Merck VWR) in accordance with Patent Application DE 10 2009 030 846. This intermediate is esterified using aconitic acid by the synthetic procedure described and then sulfonated in the final reaction step by means of an aqueous sodium hydrogensulfite solution. The dynamic surface tension $\gamma_{dyn.}$ is determined by the method indicated and is 66.6 mN/m (100 ms, 0.1% by weight). The static surface tension $\gamma_{stat.}$ is determined by the method indicated and is 17.7 mN/m.

Example 3: Preparation of Surfactant Mixtures According to the Invention and Determination of the Static Surface Tension a) A mixture of a fluorinated phosphoric acid ester (Chemguard® S760-P, abbreviated to CG) and the compound of Example 1 (A) in the mixing ratio 20/80 (CG/A, based on % by weight) is prepared.

The entire mixture is adjusted to a solids content of 35% by weight using deionised water.

b) Analogously to a), surfactant mixtures in the mixing ratios 90/10, 85/15, 75/25 and 70/30 (A/CG) are prepared.

c) The static surface tensions are determined by the method indicated and are summarised in Table 1.

TABLE 1

| Surfactant/mixture | γ [mN/m] at 2 g/l |
|---|---|
| Chemguard S-760P | 18.71 |
| Compound A | 21.00 |
| 90:10 | 18.34 |
| 85:15 | 17.28 |
| 80:20 | 17.14 |
| 75:25 | 16.92 |
| 70:30 | 16.84 |

It becomes clear from the results that, at a concentration by weight of 2 g/l in water, the surfactant mixtures significantly reduce the static surface tension from a ratio of compound A to compound CG of 85:15. Synergistic effects in the range 0.4-1.9 mN/m can be achieved in various mixing ratios.

BRIEF DESCRIPTION OF DRAWINGS

FIG. 1 shows the static surface tensions $\gamma_{stat.}$ of the surfactant mixtures according to Example 4.

FIG. 2 shows the static surface tensions $\gamma_{stat.}$ of the individual components of Example 4.

The invention claimed is:

1. A surfactant mixture comprising at least one compound A whose dynamic surface tension $\gamma_{dyn.}$ measured according to the bubble pressure method at 20° C.±0.2° C. at a use concentration of 0.1% by weight and a bubble lifetime of 100 ms is ≤35 mN/m, and at least one compound B whose static surface tension $\gamma_{stat.}$ is ≤the static surface tension $\gamma_{stat.}$ of compound A, wherein at least one of the compounds A and at least one of the compounds B is a fluorosurfactant wherein the static surface tension $\gamma_{stat.}$ is measured by the Wilhelmy plate method at 20° C.±0.2° C. at a use concentration of 0.1% by weight, wherein the static surface tension $\gamma_{stat.}$ of the surfactant mixture is lower than the static surface tensions $\gamma_{stat.}$ of the individual surfactants, wherein the compound B has static surface tension $\gamma_{stat.}$ of ≤20 mN/m, wherein said mixture comprises the compounds A and B in a weight ratio A/B of 10:90 to 90:10, wherein said mixture comprises as compound A and/or compound B at least one compound of the formula (I)

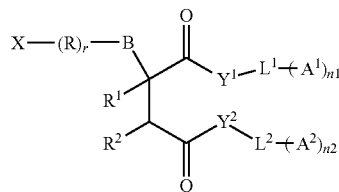

where
X is a hydrophilic group,
R is linear or branched alkylene, where one or more non-adjacent C atoms may be replaced by O, S and/or N,
r is 0 or 1,
B is a single bond, O, NH, NR', $CH_2$, C(O)—O, S, $CH_2$—O, O—C(O), O—C(O)—O, $SiR'_2$—O, O—$SO_2$ or $SO_2$—O, where R' is linear or branched alkyl,
$R^1$ and $R^2$ are, independently of one another, hydrogen or —$CH_2$—$COY^3$-$L^3$-$(A^3)_{n3}$,
$Y^1$, $Y^2$ and $Y^3$ are, independently of one another, O, S or N,
$L^1$, $L^2$ and $L^3$ are, independently of one another, linear or branched alkylene,
where one or more non-adjacent C atoms may be replaced by O, S and/or N,
$A^1$, $A^2$ and $A^3$ are, independently of one another, hydrogen or a group of the structure —$Z^i(CR^3R^4)_{mi}Rf^i$, where i is 1, 2 or 3,
$Z^i$ is O, S or N and is bonded to a C atom of $L^i$ or is a single bond,
$R^3$ and $R^4$ are, independently of one another, hydrogen or an alkyl group,
$Rf^i$ is a fluorine-containing radical,
n1, n2 and n3 are, independently of one another, 1-6,
m1, m2 and m3 are, independently of one another, 0-5,
and the compounds of formula (I) contain at least one $Rf^i$ group and wherein said mixture comprises at least one compound of the formula (II)

$$(RF\text{-}(spacer)_m)_n M \qquad (II)$$

where
the RF-(spacer)$_m$ group is equal to $C_nF_{2n'+1}$—, $C_nF_{2n'+1}$—$CH_2CH_2$—, $C_nF_{2n'+1}$—$OCF_2CF_2$—, $C_nF_{2n'+1}$—$OC_6H_4$—, $C_nF_{2n'+1}$—C(O)NH(CH$_2$)$_3$N=, $C_nF_{2n'+1}$—SO$_2$NH(CH$_2$)$_3$N=, $CF_3CCl_2(CF_2CFCl)_{n'+1}$—CF$_2$— or $C_8F_{17}CH_2CH_2Si(CH_3)_2$—, where n'=4-12, and
M is equal to —OPOO$^-$, —COO$^-$, —SO$_3^-$, —OSO$_3^-$, —OP(O)(O$^-$)O— or —OP(O)O$_2^{2-}$
n is ≥1,
and
wherein said at least one compound of the Formula (II) is at least one compound A or at least one compound B.

2. The surfactant mixture according to claim 1, wherein the compounds A have a dynamic surface tension $\gamma_{dyn.}$ of ≤30 mN/m and the compounds B have a static surface tension $\gamma_{stat.}$ of ≤20 mN/m.

3. The surfactant mixture according to claim 1, wherein said compound of the formula (I) is a compound of the formulae (III), (IV) and/or (V):

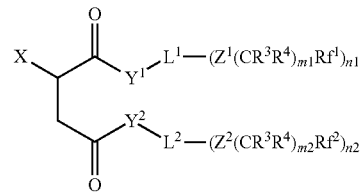

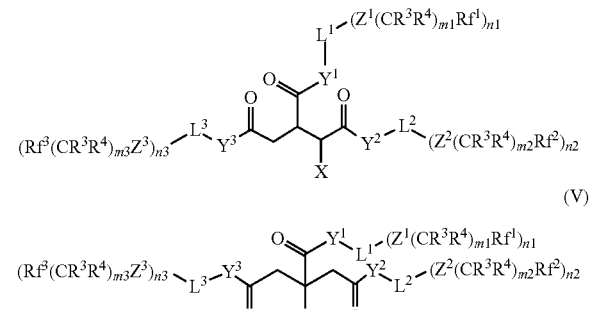

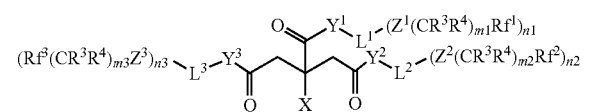

where
X is equal to —SO$_3^-$, —OSO$_3^-$, —PO$_3^{2-}$ or OPO$_3^{2-}$,
$Y^1$, $Y^2$, $Y^3$, $Z^1$, $Z^2$ and $Z^3$ are equal to O,
$Rf^1$, $Rf^2$ and $Rf^3$ are equal to perfluorinated groups $Rf^i$ having 1 to 4 C atoms,
n1, n2 and n3 are equal to 1 or 2,
m1, m2 and m3 are equal to 1-4,
$L^1$, $L^2$ and $L^3$ are equal to linear or branched C3-C6-alkylene,
$R^3$ and $R^4$ are equal to hydrogen or an alkyl group having 1 to 3 C atoms.

4. The surfactant mixture according to claim 1, wherein in the compound of the formula (II), where M is equal to —OPOO$^-$, —COO$^-$, —SO$_3^-$, —OSO$_3^-$, —OP(O)(O$^-$)O— or —OP(O)O$_2^{2-}$
with H$^+$, Na$^+$, K$^+$, Li$^+$ or NH$_4^+$ as counterion.

5. The surfactant mixture according to claim 1, wherein said mixture comprises a compound of the formula (IV)

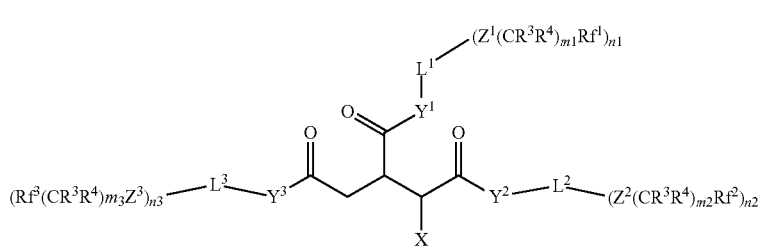

(IV)

where

X is equal to —SO$_3^-$, —OSO$_3^-$, —PO$_3^{2-}$ or OPO$_3^{2-}$,

Y$^1$, Y$^2$, Y$^3$, Z$^1$, Z$^2$ and Z$^3$ are equal to O,

Rf$^1$, Rf$^2$ and Rf$^3$ are equal to perfluorinated groups Rf' having 1 to 4 C atoms, n1, n2 and n3 are equal to 1 or 2, m1, m2 and m3 are equal to 1-4, L$^1$, L$^2$ and L$^3$ are equal to linear or branched C3-C6-alkylene, R$^3$ and R$^4$ are equal to hydrogen or an alkyl group having 1 to 3 C atoms and a compound of the formula (II)

(RF-(spacer)$_m$)$_n$M  (II)

where (RF-(spacer)$_m$)$_n$- is equal to C$_{n'}$F$_{2n'+1}$—CH$_2$CH$_2$— and M is equal to —OPOO$^-$, and n'=4-12 and with Na$^+$ as counterion wherein said at least one compound of the Formula (IV) is at least one compound A or at least one compound B and wherein said at least one compound of the Formula (II) is at least one compound A or at least one compound B.

6. The surfactant mixture according to claim 1, wherein said mixture further comprises at least one compound of the formulae (VII) to (X)

(VII)

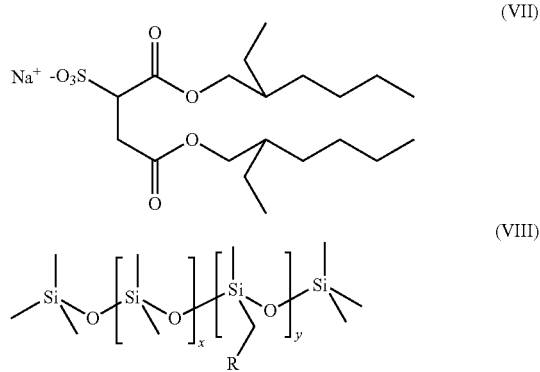

(VIII)

where x=1-500, y=1-500 and R=phenyl, methyl or —(O—C$_2$H$_3$R')$_{n''}$—OR'', where n''=1-1000, R'=linear and branched alkyl radical and R''=linear and branched alkyl radicals, M$_2$(D'E$_{n'''}$)PM  (IX)

where M=(CH$_3$)$_3$SiO—, D'=Si(CH$_3$)(R'''), E=OCH$_2$CH$_2$, n'''=5-40 and P=OH, OMe or OAc, where R'''=linear and/or branched alkyl chain,

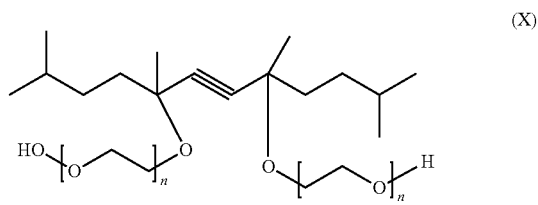

(X)

where n=1-100.

7. A composition comprising the surfactant mixture according to claim 1 and a vehicle.

8. The composition according to claim 7, wherein said composition is a paint, a coating preparation, a fire-extinguishing agent, a lubricant, a washing agent, a detergent, a de-icer, a hydrophobicisation agent for textile finishing or glass treatment, a floor polish, an adhesive, a developer solution, a rinse solution, an immersion oil or a photoresists for a photolithographic process.

9. A method comprising incorporating the surfactant mixture according to claim 1 as an additive into a paint, a lacquer, a printing ink, a protective coating, a coating in an electronic or optical application, a photoresist, a top antireflective coating, a bottom antireflective coating, a photographic coating, a coating of an optical element, a floor polish, an adhesive, a fire-extinguishing agent, a lubricant, a washing agent, a detergent, a de-icer, a developer solution, a rinse solution, an immersion oil or a photoresist for a photolithographic process.

10. A compound of formula (IV-1)

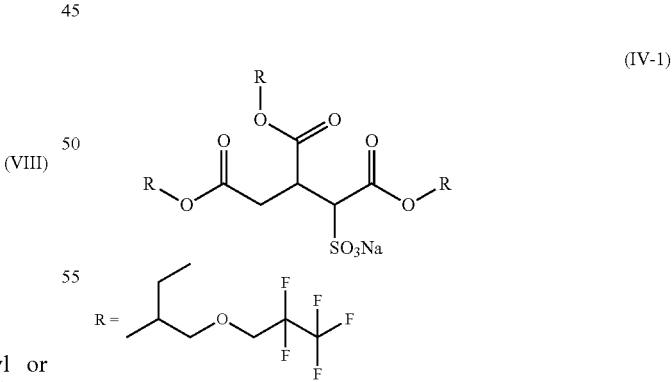

(IV-1)

wherein * defines the point of attachment.

11. A composition comprising the compound of the formulae (IV-1) of claim 10 and a vehicle.

12. The composition according to claim 11, wherein said composition is a paint, a coating preparation, a fire-extinguishing agent, a lubricant, a washing agent, a detergent, a de-icer, a hydrophobicisation agent for textile finishing or glass treatment, a floor polish, an adhesive, a developer solution, a rinse solution, an immersion oil or a photoresists for a photolithographic process.

13. A method comprising incorporating the compound of formula (IV-1) of claim 10 as an additive into a paint, a lacquer, a printing ink, a protective coating, a coating in an electronic or optical application, a photoresist, a top antireflective coating, a bottom antireflective coating, a photographic coating, a coating of an optical element, a floor polish, an adhesive, a fire-extinguishing agent, a lubricant, a washing agent, a detergent, a de-icer, a developer solution, a rinse solution, an immersion oil or a photoresist for a photolithographic process.

14. The method of claim 13 wherein the compound of the formulae (IV-1) is incorporated as a surfactant.

* * * * *